Nov. 13, 1962 A. R. HATCH 3,063,751
COMBINATION BACK AND HEAD REST
Filed May 19, 1961 2 Sheets-Sheet 1
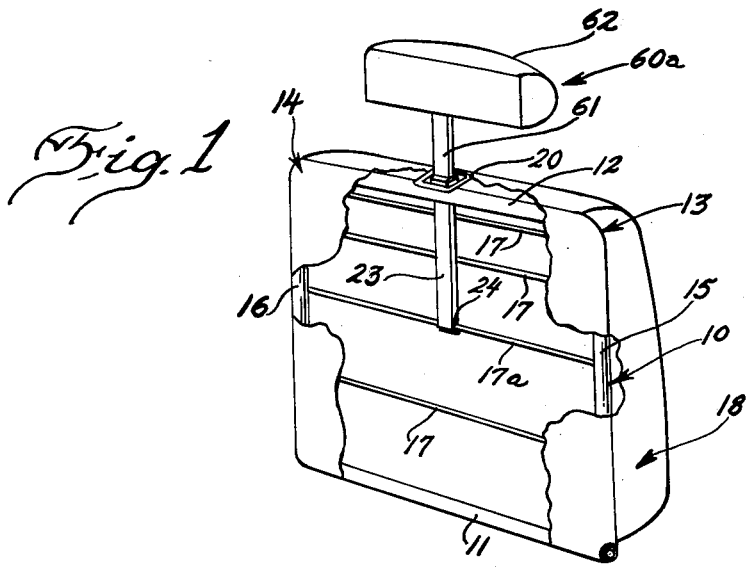
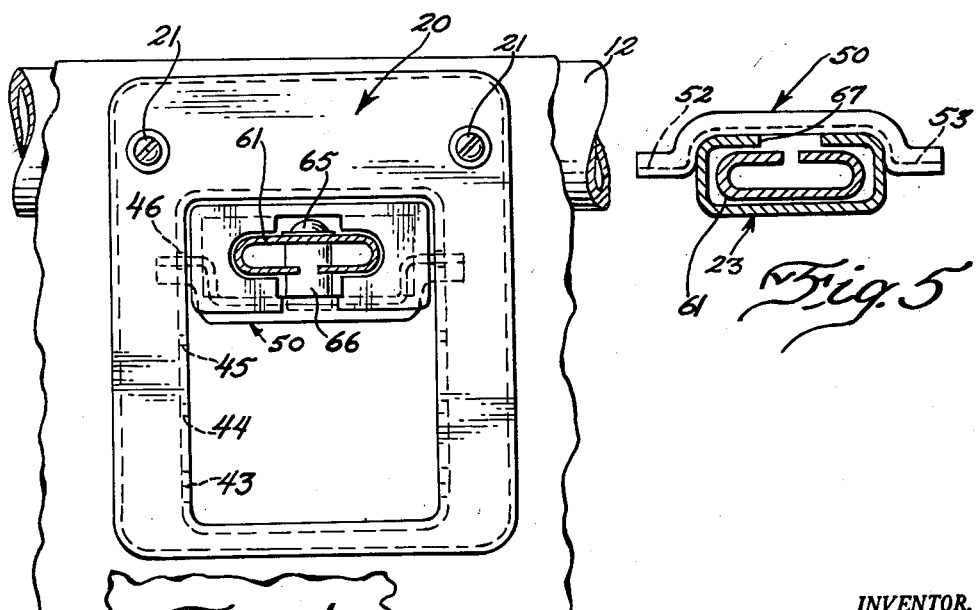
INVENTOR.
ARTHUR R. HATCH
BY
ATTORNEY Nov. 13, 1962 A. R. HATCH 3,063,751
COMBINATION BACK AND HEAD REST
Filed May 19, 1961 2 Sheets-Sheet 2

INVENTOR.
ARTHUR R. HATCH
BY
Carl J. Barbee
ATTORNEY

United States Patent Office 3,063,751
Patented Nov. 13, 1962

3,063,751
COMBINATION BACK AND HEAD REST
Arthur R. Hatch, Plymouth, Mich., assignor to American Motors Corporation, Kenosha, Wis., a corporation of Maryland
Filed May 19, 1961, Ser. No. 111,381
8 Claims. (Cl. 297—410)

The invention relates to a combination seat back rest and head rest assembly. The invention has particular reference to the multiple adjustment capabilities of the head rest relative to the back rest.

The principal object is to provide a head rest assembly which is adjusable back and forth as well as up and down with reference to the back rest.

Anothes object is to provide a head rest which employs adjustment mechanism which is concealed within the interior of the back rest.

A specific object is to provide a back rest employing a hollow supporting column which is carried by the back rest in such a manner as to permit back and forth movement thereof while telescopically accommodating the stem which carries the head rest, such stem being capable of up and down adjustment within the supporting column.

Other objects and advantages of the invention will be apparent from the ensuing specification and appended drawings in which:

FIG. 1 is a perspective rear view of the combination seat back rest and head rest assembly with certain specific mechanical details omitted for purposes of clarity.

FIG. 4 is a fragmentary view taken generally on the line 4—4 of FIG. 3.

FIG. 5 is a sectional detail view taken on the line 5—5 of FIG. 3.

Figure 2:
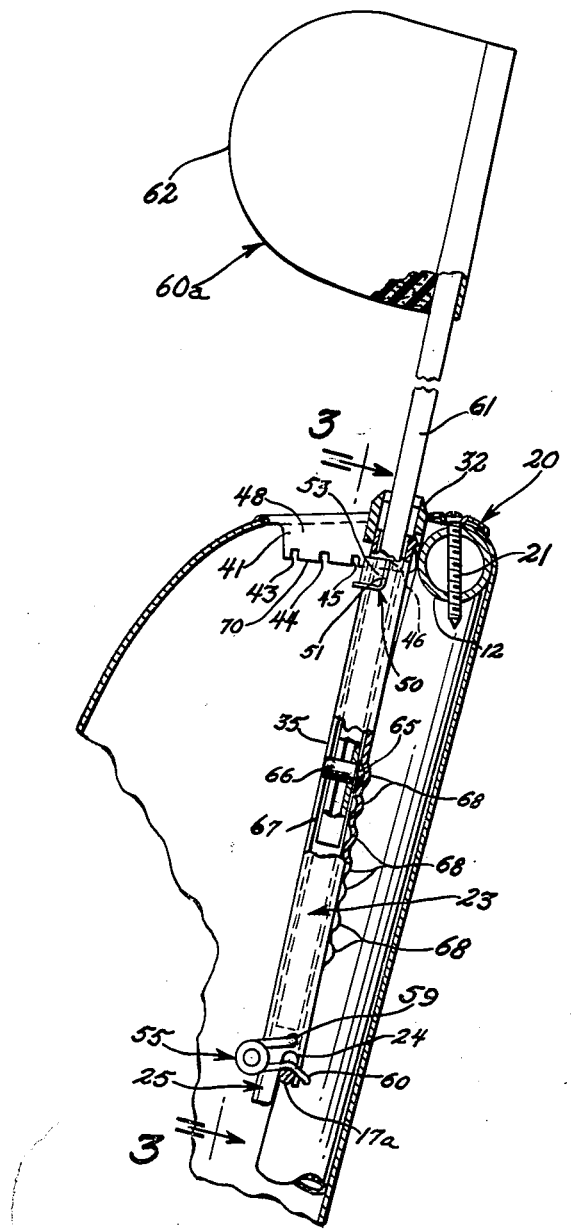
FIG. 2 is a side view of the upper portion of the back rest and showing portions of the head rest assembly in section.

Referring to FIG. 1, there is shown a conventional seat back rest of the type which may be employed in the passenger compartment of an automobile. The back rest includes a generally rectangular shaped frame 10 comprised of a lower tubular member 11 and an upper tubular member 12 bent downwardly at its corners 13 and 14 to provide the side frame members 15 and 16, tne lower ends of which are anchored to the frame member 11.

A number of transverse supporting wires 17 extend between the side frame members to which a number of coil springs (not shown) are anchored for providing the cushioning portion of the back rest. This entire assemblage is covered with a suitable upholstery material providing an overall cover identified by the numeral 18.

Figure 3:
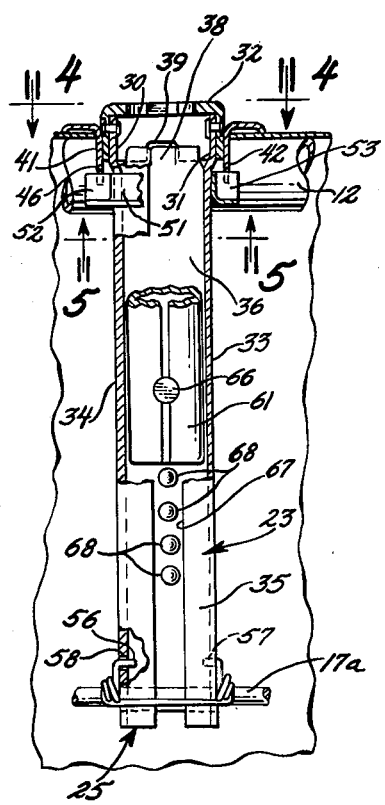
FIG. 3 is a fragmentary front view, partly in section, of a portion of the back rest assembly taken generally on the line 3—3 of FIG. 2.

The head rest assembly is carried relative to the back rest by means of the upper frame member 12 and one of the cross wires 17a. A mounting plate 20 is rigidly anchored to the frame member 12 as by means of suitable screws 21. A hollow supporting column 23 has an elongated notch 24 formed at its lower end 25 for swingably anchoring the column at its lower end to cross wire 17a. The column is capable of limited up and down movement as will be explained hereinafter; however, the wire 17a always remains within the notch 24. The upper end of the column is flared outwardly slightly and a cap 32 is anchored to the outwardly flared ears 30 and 31 which are formed as part of the upper ends of the column side walls 33 and 34. The front and rear walls 35 and 36 respectively of the column, terminate at their upper ends short of the termination points of side walls 33 and 34, as can best be viewed in FIG. 3. The upper end of the column rear wall 36 has an outwardly bent tab 38 which is received within a notch 39 formed in the rear wall of the cap 32.

The mounting plate 20 may be in the form of a stamping having downwardly depending flanges 41 and 42 with notches 43, 44, 45 and 46 formed therein. The opening 48 in the mounting plate is sufficient to permit back and forth swinging movement of the column 23 within the range provided by the flange notches. Thus, four positions of back and forth adjustment are provided. A bracket 50 (best shown in FIG. 5) is anchored to the forward wall of the column and is provided with a flange 51, the outer ends 52 and 53 of which serve as pawls for reception in one set of flange notches for temporarily anchoring the head rest in a selected position of back and forth adjustment. A torsion spring 55 has its free ends 56 and 57 received in openings 58 and 59 of the side walls of the column and intermediate arm portions 60, on either side of the column, overhang the wire 17a thereby continuously urging the column in an upward direction wherein the pawls 52 and 53 are maintained within one set of flange notches.

The head rest identified generally by the numeral 60a includes an elongated post or stem 61 which is telescopically received within the interior of column 23. A pillow assembly 62 is secured to the upper end of the stem. The stem may be generally channel-shaped in cross section and has a spring-pressed ball 65 held within a suitable container 66. The front end of the container 66 projects into the gap 67 which is formed in the front wall of the column for guiding the movement of the stem within the column. The rear wall of the column is provided with a series of identations 68 for receiving the spring-pressed ball for temporarily anchoring the stem in a selected position of height adjustment relative to the back rest.

*Operation*

In the operation of effecting adjustments of the head rest, the up and down adjustment thereof is accomplished simply by manually grasping the pillow assembly and pulling upwardly thereon or pushing downwardly thereon, depending upon the desired direction of adjustment. Such manual pressure overcomes the resistance of the spring pressed ball in its position in one of the column indentations and a different indentation can be selected for temporarily positioning the height adjustment of the head rest.

In effecting the back and forth adjustment of the head rest, it is necessary to manually grasp the cap 32 and depress the column 23 downwardly against the resistance of spring 55 until the pawls 52 and 53 are clear of the under edges 70 of the plate flanges 41 and 42. Then, the column can be swung pivotally about the axis of the wire 17a until the desired position of adjustment is obtained. Then, the downward manual pressure on cap 32 can be released to permit the flange pawls to re-enter a different set of flange notches.

I claim:

1. A head and back rest assembly comprising: a back rest including a supporting frame and a human back accommodating material carried on the frame; a head rest assembly carried by the back rest assembly for up and down movement and back and forth movement relative thereto; said head rest assembly including:

A hollow column carried by the supporting frame for limited reciprocal movement relative thereto;

a head rest having an elongated stem telescopically received within the column for reciprocal movement relative thereto to adjust the up and down position of the head rest relative to the back rest;

means associated with the reciprocal movement of the column for anchoring the head rest in a selected position of back and forth adjustment.

2. A head and back rest assembly comprising: a back rest including a supporting frame and a human back accommodating material carried on the frame; a head rest assembly carried by the back rest assembly for up and down movement and back and forth movement relative thereto; said head rest assembly including:

a column pivotally connected to the frame whereby the column swings back and forth relative to the frame about the axis of the pivotal connection, said column being mounted on the pivotal connection for up and down reciprocal movement relative thereto and relative to the frame a head rest adjustably carried by the column and means for removably anchoring the column relative to the frame in a selected position of back and forth adjustment, said means being effective by the up and down movement of the column relative to the pivotal connection.

3. A head and back rest assembly comprising: a back rest including a supporting frame and a human back accommodating material carried on the frame; a head rest assembly carried by the back rest assembly for up and down movement and back and forth movement relative thereto; said head rest assembly including:

a column carried by the supporting frame for up and down reciprocal movement relative thereto and for back and forth swinging movement relative thereto;

a head rest having a stem portion carried by the column for up and down adjustment relative thereto;

means for removably anchoring the column relative to the frame in a selected position of back and forth adjustment and resilient means for normally urging the column upwardly relative to the frame.

4. A head and back rest assembly comprising: a back rest including a supporting frame and a human back accommodating material carried on the frame; a head rest assembly carried by the back rest assembly for up and down movement and back and forth movement relative thereto; said frame having means for providing a pivotal support for the head rest assembly whereby to accord the back and forth movement thereof; said head rest assembly including a column having engagement with the pivotal support means for permitting the back and forth swinging movement thereof about the axis of the pivotal support means while also permitting reciprocal up and down movement relative to such pivotal support means; said head rest assembly also including a head rest having a stem portion reciprocably carried by the column to permit up and down adjustment of the head rest relative to the column and means on the frame for holding the column in a selected position of back and forth adjustment relative to the frame, said means being effective by the up and down movement of the column relative to the pivotal support means.

5. Apparatus as set forth in claim 4 wherein resilient means coact between the column and frame for normally urging the column into engagement with the holding means.

6. Apparatus as set forth in claim 5 wherein the means on the frame for holding the column in a selected position of back and forth adjustment include a notched bracket anchored to the frame and a pawl anchored to the column for reception in one of such bracket notches.

7. Apparatus as set forth in claim 6 wherein the bracket has an enlarged opening therein through which the column and head rest stem project and the end walls of such opening determine the limits of the back and forth movement of the column.

8. A head and back rest assembly comprising: a back rest including a support frame and a human back accommodating material carried on the frame; said back rest having an opening at the upper end thereof; a head rest assembly having a portion insertible into the interior of the back rest through the opening and being removably carried by the back rest assembly for up and down movement and back and forth movement relative thereto; said head rest assembly including a bracket mounted in the opening of the back rest and being secured to the frame; said frame having means for providing a pivotal support for the head rest assembly whereby to accord the back and forth movement thereof; said head rest assembly including a column having engagement with the pivotal support means for permitting back and forth swinging movement thereof about the axis of the pivotal support means; said head rest assembly also including a head rest having a stem portion reciprocably carried by the column to permit up and down adjustment of the head rest relative to the column; said bracket having an opening therein to accommodate the back and forth swinging movement of the column and of the stem portion of the head rest and means manually operable at the upper end of the column for coacting with the bracket for removably anchoring the column and stem in a selected position of back and forth adjustment relative to the bracket.

References Cited in the file of this patent

UNITED STATES PATENTS

| | | |
|---|---|---|
| 1,763,294 | Emmert | June 10, 1930 |
| 1,869,765 | Mitchell | Aug. 2, 1932 |
| 2,370,447 | Burris | Feb. 27, 1945 |
| 2,466,553 | McDonald | Apr. 5, 1949 |
| 2,831,530 | Chiopelas et al. | Apr. 22, 1958 |